Feb. 14, 1967  A. F. MANZ  3,304,485

WELDING ARC POWER SUPPLY

Filed Dec. 26, 1963  4 Sheets-Sheet 1

INVENTOR.
AUGUST F. MANZ

BY Barnwell R. King
ATTORNEY

INVENTOR.
AUGUST F. MANZ
BY Barnwell P. King
ATTORNEY

Feb. 14, 1967 A. F. MANZ 3,304,485
WELDING ARC POWER SUPPLY
Filed Dec. 26, 1963 4 Sheets-Sheet 3

INVENTOR.
AUGUST F. MANZ
BY Barnwell R. Fing
ATTORNEY

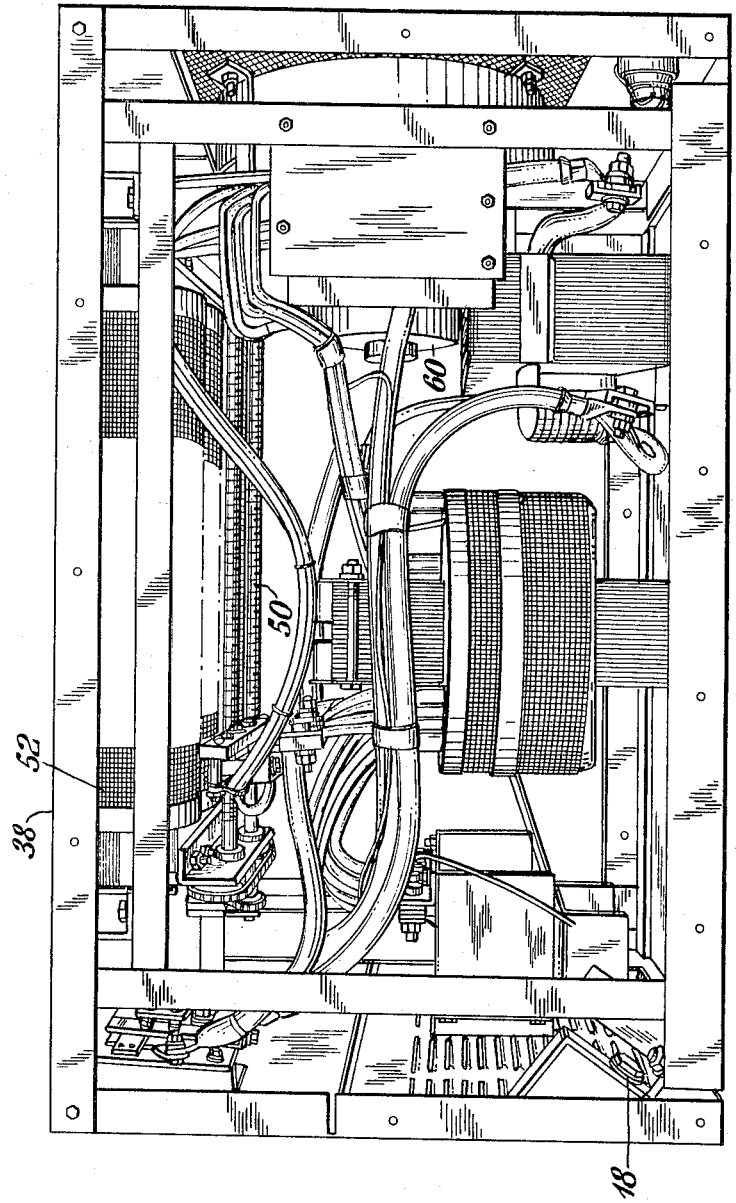

United States Patent Office 3,304,485
Patented Feb. 14, 1967

3,304,485
WELDING ARC POWER SUPPLY
August F. Manz, Newark, N.J., assignor to Union Carbide Corporation, a corporation of New York
Filed Dec. 26, 1963, Ser. No. 333,282
4 Claims. (Cl. 321—8)

This invention relates to electric arc welding, and more particularly to a power supply therefor.

The invention provides an improvement in apparatus for supplying arc current from an A.C. source, comprising a transformer the input of which is adapted to be connected to such source, means for adjusting such transformer output to select a desired potential across output terminals, means including a contactor switch for connecting the output of the transformer to such output terminals, and a voltmeter connected to such terminals for indicating such potential when said contactor switch is closed. The improvement involves novel circuit means including a switch for connecting said voltmeter to the output of said transformer when said contactor switch is open to indicate the potential that would subsequently appear across such terminals when the contactor switch is closed, whereby the desired potential across such terminals can be preselected by operating said adjustable means while such terminals are deenergized.

Heretofore, energization of the power supply output terminals has been necessary for measuring the potential across such terminals with a voltmeter. In the case of open circuit potential, a hazard is present that is not only dangerous to the operator, but can be the cause of accidental undesirable arcing in the equipment prior to actual welding. Furthermore, mechanical indicators of the prior art failed to provide an accurate indication of the desired voltage when the line voltage happened to be different from that which was used in calibrating the mechanical indicator.

The main object of this invention is to provide an arc welding power supply including electrical means for overcoming such problems, that is simple yet economical.

In the drawings:

FIG. 5 is a perspective view looking toward the side of such power supply with the side panel removed.

Figure 1:
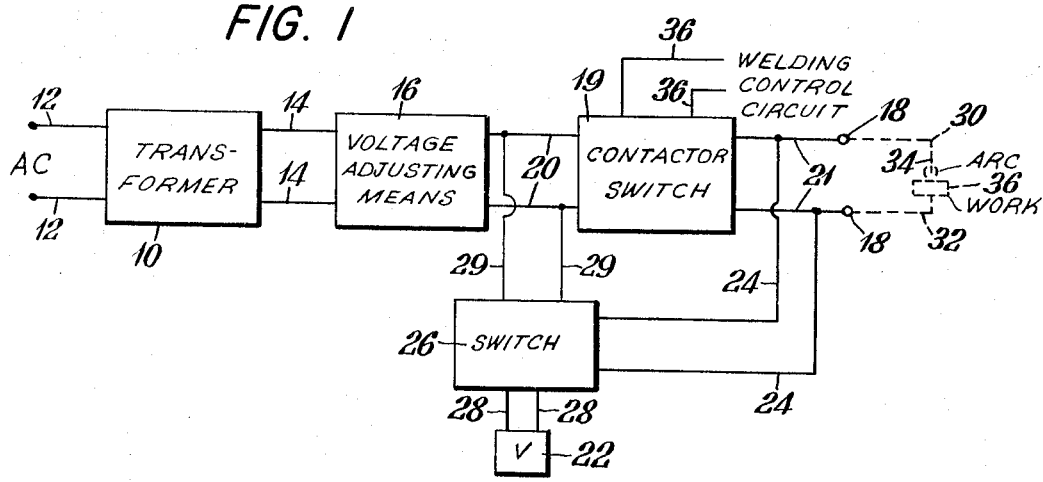
FIG. 1 is a block diagram of a power supply illustrating the invention.

As shown in FIG. 1, transformer 10 is provided with an A.C. input that is connected by leads 12, 12 to any suitable A.C. source (not shown). The output of such transformer is connected by leads 14, 14 to means 16 for adjusting such output to a desired potential across output terminals 18 that are adapted to be connected to such output by contactor switch 19 through leads 20 and 21. A voltmeter 22 is connected to such terminals 18 by leads 24, a switch 26 and leads 28, for indicating such potential, when the contactor switch 19 is closed. Such switch 26 is also connected directly to the adjustable output means 16 by leads 29, so that the voltmeter can be selectively switched to indicate either the potential across output terminals 18, or that of the adjustable output means 16.

The output terminals 18 are adapted to be connected to welding current leads 30 and 32 of electric arc welding equipment including an electrode 34, and work 36 to be welded. With such equipment, so connected, and contactor switch means 19 open, so that output terminals are deenergized, or "cold", switch 26 is operated to connect voltmeter 22 directly to the output of the adjustable output means 16. The potential is then adjusted as may be desired by reading the voltmeter 22. Thus, when the contactor switch means is closed by energization of welding control leads 36, such selected potential is applied to the welding current leads 30, 32 through the so-energized output terminals 18.

Figure 3:
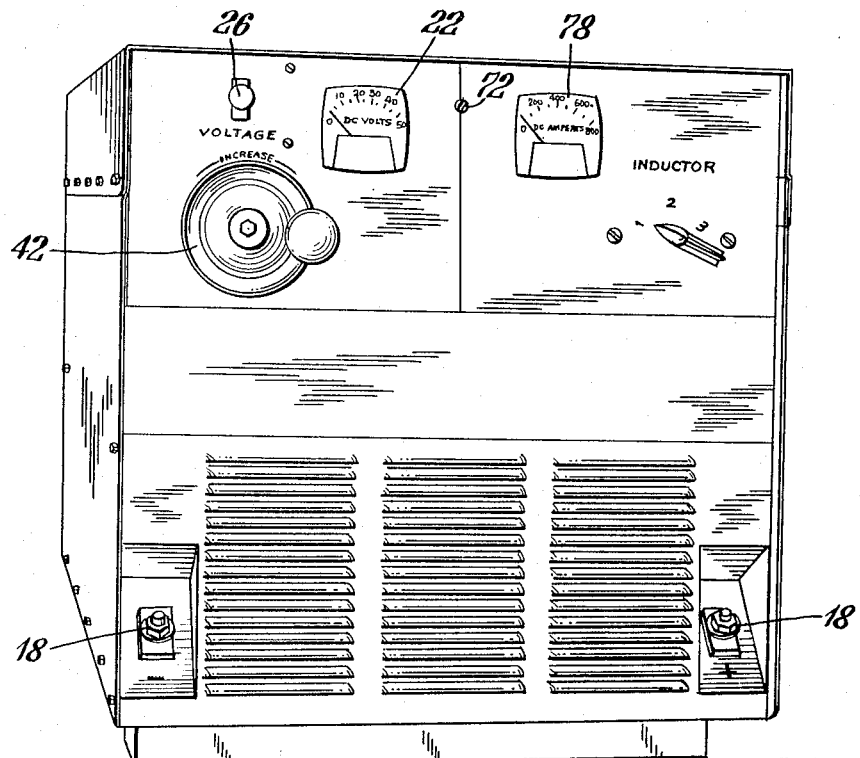
FIG. 3 is a view in perspective looking toward the front of such power supply.
Figure 2:
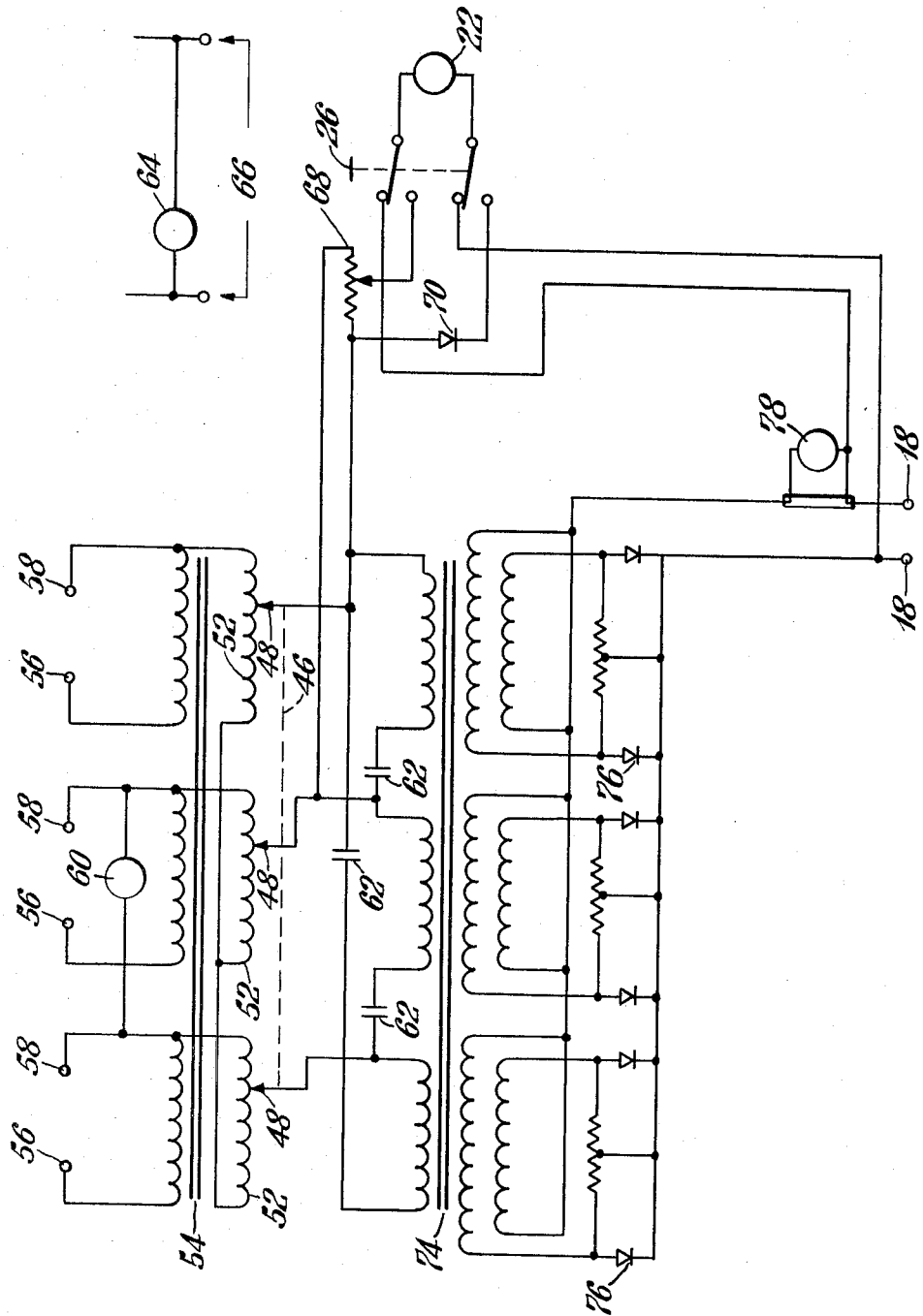
FIG. 2 is a circuit diagram of an actual power supply of the invention involving a polyphase input and a D.C. output.
Figure 4:
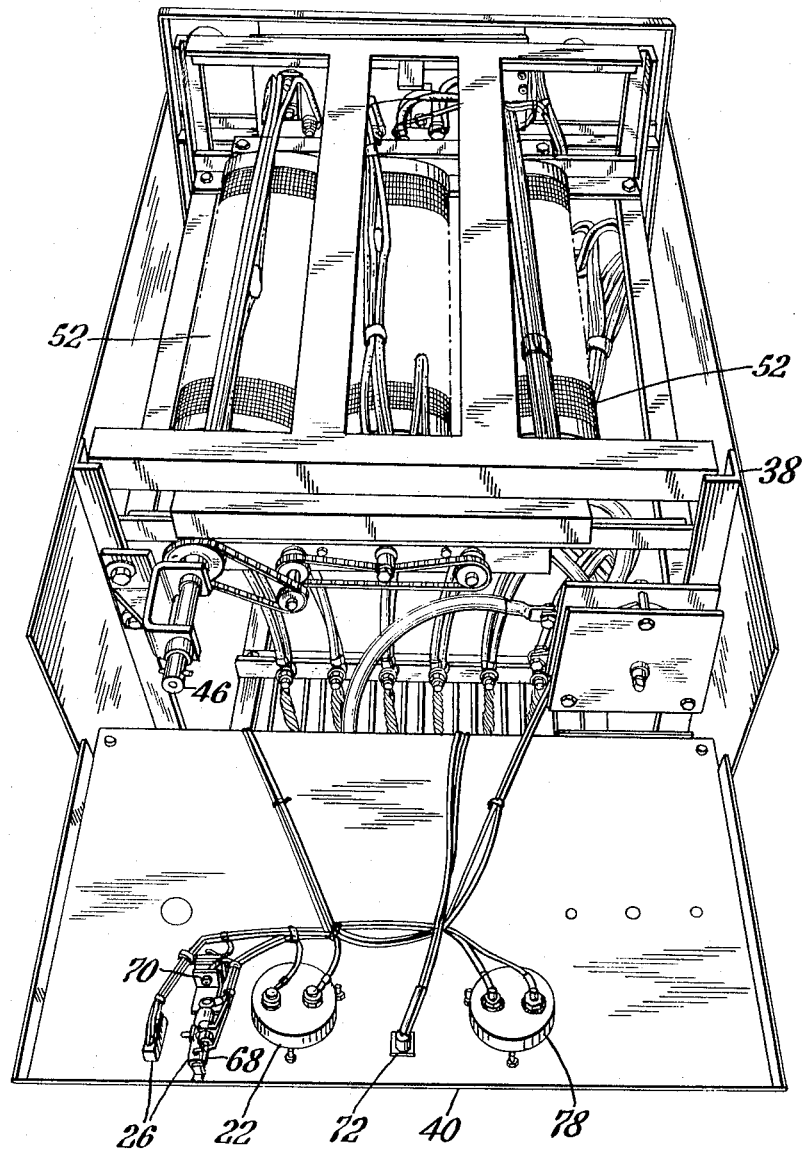
FIG. 4 is a perspective view of the power supply with the top panel removed and the front panel open.

Referring to FIG. 2, there is shown a simplified circuit diagram of an actual supply unit 38, different views of which are shown in FIGS. 3–5, embodying the invention. Such unit is provided with the unique system of the present invention for setting open circuit voltage by means of the welding output voltmeter 22 and push button switch 26 located on the upper left front corner of the front panel 40 of the power supply. By pushing the button and adjusting voltage hand wheel 42, the welding open circuit voltage may be selected without energizing the power supply welding output terminals 18. This open circuit voltage setting system provides a novel "dead set" procedure.

Shaft 46 of handwheel 42 is mechanically connected to sliding brushes 48 through suitable means including screws 50 located under secondary coils 52, for adjusting the output voltage of three-phase input transformer 54. Such transformer has input terminals 56 for connection to a 460-volt source, for example; and input terminals 58 for connection to a 230-volt source, for example. A cooling fan motor 60 is connected across one phase of the A.C. input. Contactor switches 62 are operated by a solenoid 64 energized by a 115-volt source 66 when connected thereto by the welding control circuit.

The D.C. voltmeter 22 is initially calibrated by adjusting potentiometer 68 in circuit with a meter-rectifier 70, when switch 26 is operated to complete such circuit. A pilot lamp 72 is connected so as to light when solenoid 64 is energized. Output transformer 74 adapts the voltage from the input transformer, when contactor switches 62 are closed, to a welding value when fully rectified by rectifier 76. Ammeter 78 is connected to indicate the rectified current.

The illustrated unit has been constructed with a dual output rating of 500 amperes at 40 volts D.C., 100% duty cycle and 675 amperes at 40 volts D.C., 60% duty cycle. Its output voltage can be adjusted through its entire range with the single handwheel adjustment. This permits programming and operating the weld system without turning the power supply off to change ranges, as was done in prior commercial competitive equipment. The unit has a fixed static volt/ampere characteristic for cored wire electrode arc welding. Such characteristic is also suitable for submerged-melt, as well as $CO_2$ welding. The sides and top are removable for easy servicing.

What is claimed is:

1. An apparatus for supplying arc current from an A.C. source, comprising a transformer, means for adjusting the output of said transformer to select a desired potential across output terminals, means including a contact or switch for connecting the output of said transformer to such output terminals, a voltmeter connected to such terminals for indicating such potential when said contactor switch is closed and circuit means including a switch for connecting said voltmeter to the output of said transformer when said contactor switch is open to indicate the potential that would subsequently appear across such terminals when the contactor switch is closed, whereby the desired potential across such terminals can be preselected by operating said adjustable means while such terminals are deenergized.

2. In apparatus as defined by claim 1, which includes means for rectifying the arc current as well as the voltmeter current.

3. In apparatus for supplying arc current from an A.C. source, comprising a transformer the input of which is adapted to be connected to such source, means for adjusting such transformer output to select a desired potential across output terminals, means including a contactor switch for connecting the output of said transformer to such output terminals, a voltmeter connected to such terminals for indicating such potential when said contactor switch is closed, and circuit means including a switch for connecting said voltmeter to the output of said transformer when said contactor switch is open to indicate the potential that would subsequently appear across such terminals when the contactor is closed, whereby the desired potential across such terminals can be preselected by operating said adjustable means while such terminals are deenergized.

4. In arc welding apparatus, the combination with a polyphase input transformer which is adapted to be connected to a polyphase source of power, sliding brush means for adjusting the output voltage of said input transformer, a polyphase output transformer for changing the output voltage of said input transformer, contactor circuit means for connecting said output transformer to said input transformer, rectifier means connected to the output of said output transformer, direct current terminals connected to the output of such rectifier means, and a voltmeter connected across said terminals to indicate the potential of such rectifier output when said contactor circuit means is closed to energize said terminals; a circuit including a voltage divider and a rectifier directly connected to the output of said input transformer for providing a potential when said contactor circuit is open that is equivalent to that desired across said terminals when said contactor circuit means is closed, and switching circuit means for selectively disconnecting said voltmeter from said terminals, and connecting said voltmeter across said last named circuit, as desired, whereby the desired voltage can be preset by adjusting said sliding brush means and observing the reading on said voltmeter while said output terminals are in a deenergized state.

References Cited by the Examiner

UNITED STATES PATENTS

| | | | |
|---|---|---|---|
| 2,773,970 | 12/1956 | Galbraith et al. | 219—131 |
| 2,909,647 | 10/1959 | Glenn et al. | 219—131 |
| 3,189,816 | 6/1965 | Brozek | 323—43.5 |

JOHN F. COUCH, *Primary Examiner.*

W. E. RAY, *Assistant Examiner.*